S. R. Parkhurst
Cotton & Wool Gin.
N° 4,023.    Patented May 1, 1845.
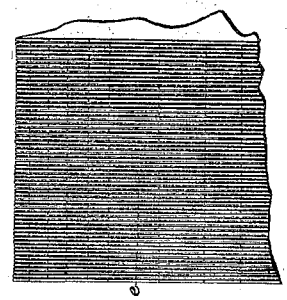
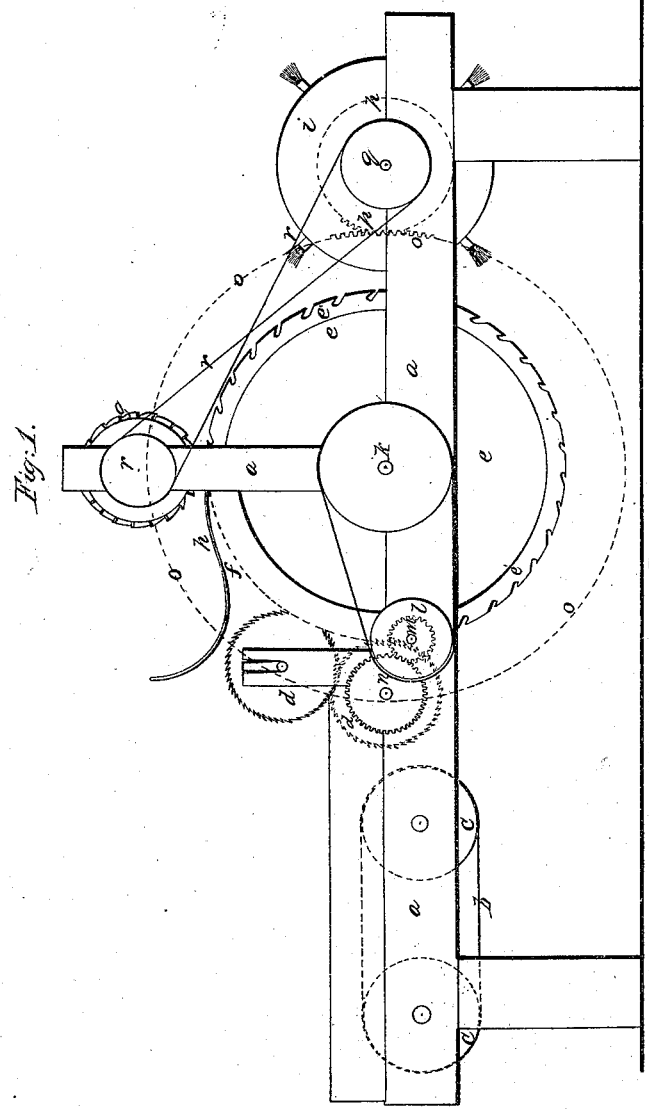
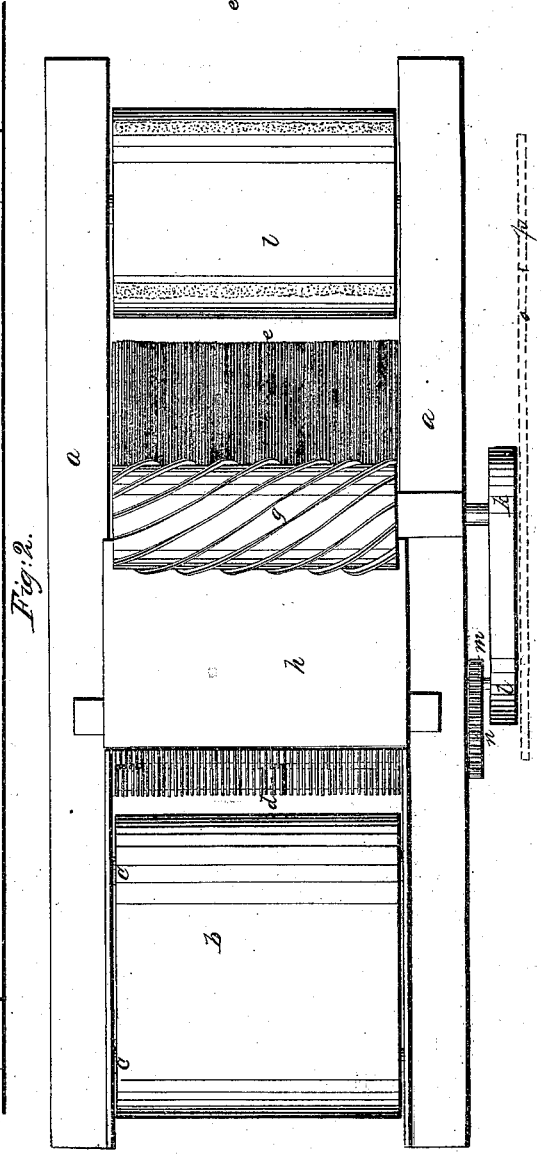

UNITED STATES PATENT OFFICE.

STEPHEN R. PARKHURST, OF NEW YORK, N. Y.

MACHINE FOR GINNING COTTON AND WOOL.

Specification forming part of Letters Patent No. 4,023, dated May 1, 1845; Reissued February 12, 1861, No. 1,137.

*To all whom it may concern:*

Be it known that I, STEPHEN R. PARKHURST, of the city, county, and State of New York, manufacturer, have invented, made, and applied to use certain new and useful improvements in the construction, arrangement, and combination of mechanical means for picking, ginning, and carding wool, hemp, or cotton, so as to separate the fibers of those articles from burs, seeds, leaves, twigs, or other foreign and useless substances, by an arrangement of mechanical means either acting separately or in combination with the common carding-machine and when so combined also acting in place of the tumblers usually employed with the carding-machine or when employed separately acting as a gin, with the common whipper or any other competent means of removing the clean material, for which said improvements I seek Letters Patent of the United States, and that the said improvements and the mode of constructing, arranging, combining and using the same and the effects produced thereby are fully and substantially shown and set forth in the following description and in the drawings annexed to and making part of this specification, wherein—

Figure 1 is a side elevation; Fig. 2, a top plan.

The construction is as follows: The frame (*a*) is of a suitable form and size to support the machinery, and at one end is an endless apron (*b*) stretched over two horizontal rollers (*c*); next to this and running quite near it are two feeding rollers (*d*), one above the other; these are covered with rings, which are serrated on their outer edges, shown in Fig. 7; which serve to feed the cotton or wool on to the burring cylinder (*e*) which runs close to them and receives the wool or cotton with the dirt, burs, or seeds on it, and carries it up under a wire grating (*f*) that is curved around just near enough to the cylinder (*e*) to let the seeds pass. This cylinder is composed of tin, with a series of alternate steel and pasteboard rings slipped on to it, which cover its periphery. The projection of the steel rings is represented at *e'* Fig. 1, and they have notches or teeth cut out of their periphery, at intervals of half an inch or more; said teeth are hooked, and have a round enlarged gullet, as shown in the drawing. This form of tooth together with the spaces between the steel rings allows the wool &c to be drawn in below the surface of the teeth (no two of which in adjoining rings are opposite) while the burs, dirt or cotton seed remain on top. In passing the grate above named, the seed &c are rolled over, and the fiber in a measure separated from them, and drawn in between the teeth, when they arrive at the top of the cylinder, at which point a tin stripper (*g*) is situated, this is a cylinder, around which are bent spiral strips of tin, that stand out from the surface radially; these run close to the surface of the teeth or cylinder (*e*) and scrape off the burs, dirt, or cotton seed into a receptacle (*h*) behind, which is placed over the grating to receive it; on the side of the burring cylinder opposite the feed rollers, a brush cylinder (*i*) is situated which brushes the fiber from the teeth of the burring cylinder (*e*).

The machine is driven by a crank or band, on the burring cylinder shaft, from a pulley (*k*) on which, a band passes to a pulley (*l*), which is joined to a pinion (*m*) upon a stud in the frame, near the lower feed roller; on the shaft of this there is a spur wheel (*n*), that works into said pinion, by which the feed rollers are driven. Outside the pulley (*k*), on the same shaft, there is a large spur wheel (*o*), (shown in the drawing by a red outline) which meshes into a pinion (*p*) on the shaft of the brush cylinder, and these are so proportioned as to give the brushes the necessary velocity; on the brush cylinder shaft there is a pulley (*q*), from which a cross band (*r*) communicates motion to the stripper (*g*); this mode of gearing, it will be obvious, however, can be varied.

What I claim as my invention in the above described machine is—

1. Arranging the metallic rings, composing the burring cylinder, so near together that no burs or seeds &c. can fall in between them, the rings (*e'*) having hooked teeth cut in the periphery as described and so placed around the cylinder as not to have the teeth on any two adjoining rings to come opposite each other, by which the wool or cotton is drawn in below the surface of the rings, and the seeds or burs are cleaned off.

2. I claim the combination of the burring cylinder ($e'$) constructed as above described with the feeding cylinders ($d$) and trash cylinder ($g$) to separate the fibers of cotton or wool from foreign or useless substances.

STEPHEN R. PARKHURST.

Witnesses:
    WM. CUNDELL,
    DAVID BURNETT.

[FIRST PRINTED 1913.]